Figure 1:
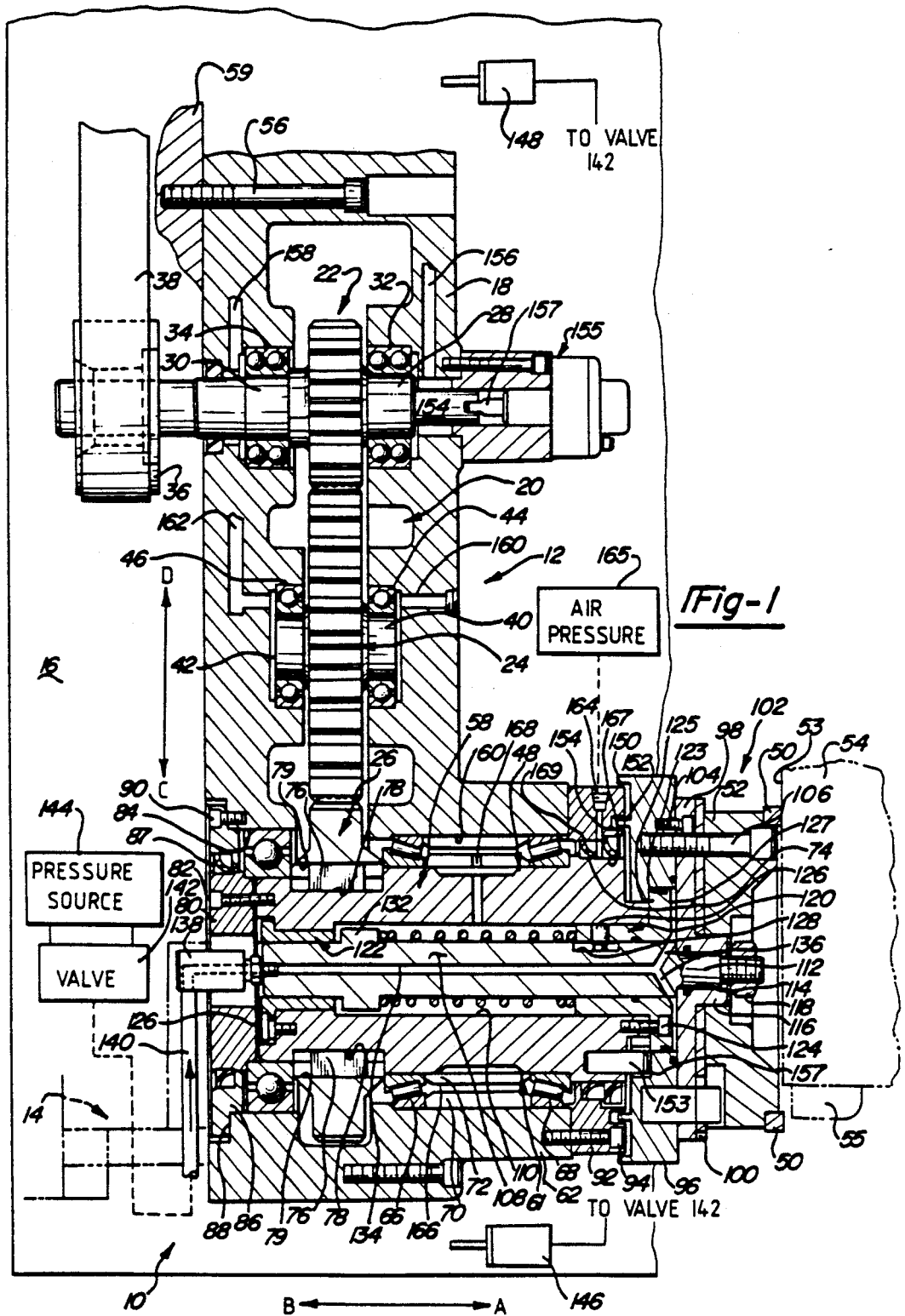

United States Patent [19]

Wawrzyniak et al.

[11] Patent Number: 5,054,975
[45] Date of Patent: Oct. 8, 1991

[54] MILLING MACHINE WITH MILL HEAD HAVING RETRACTIBLE RETURN

[75] Inventors: Walter W. Wawrzyniak, Mt. Clemens; Richard A. Habarth, Allen Park, both of Mich.

[73] Assignee: Practical Engineering, Inc., Roseville, Mich.

[21] Appl. No.: 612,074

[22] Filed: Nov. 9, 1990

[51] Int. Cl.[5] ............................. B23C 1/00; B23Q 5/20
[52] U.S. Cl. ..................................... 409/131; 409/190; 409/231
[58] Field of Search ............... 409/231, 232, 233, 234, 409/218, 208, 206, 190, 207, 185, 183, 184, 200, 315, 314, 146, 156, 58, 136, 34; 51/35, 58; 92/130 A; 408/129, 238, 10; 384/563, 229

[56] References Cited

U.S. PATENT DOCUMENTS

| | | | |
|---|---|---|---|
| 3,783,740 | 1/1974 | Seiberlich | 409/34 |
| 3,823,641 | 7/1974 | Seiberlich | 409/34 |
| 3,859,001 | 1/1975 | Hoddinott et al. | 408/10 X |
| 3,962,952 | 6/1976 | Bour | 409/208 |
| 4,271,710 | 6/1981 | Brems | 409/156 X |
| 4,932,288 | 6/1990 | James, Sr. | 409/200 X |

FOREIGN PATENT DOCUMENTS 405275  6/1978  U.S.S.R. ............................. 409/231

Primary Examiner—William Briggs
Attorney, Agent, or Firm—Harness, Dickey & Pierce

[57] ABSTRACT

A milling machine for cutting a surface on a workpiece and including a milling head assembly having a cutting stroke for cutting the surface of the workpiece and a return stroke to prepare for the next cutting stroke, the milling head assembly including a rotatable spindle structure with a cutter structure mounted to the spindle structure for rotation therewith and being actuable to provide a desired cut on the workpiece surface and a piston and cylinder construction operatively connected with the cutter structure to axially position the cutter structure separately from the spindle structure between an advanced position to provide a desired cut on the workpiece surface and a retracted position relative to the workpiece surface to preclude cutting engagement with the workpiece surface as the cutter structure is moved in opposite directions traversing the workpiece surface and a unique method providing a rough cut on the workpiece surface when the cutter structure is in the retracted position and a finish cut when the cutter structure is in the advanced position and actuating the cutter structure to the retracted position for the return stroke after the finish cut.

19 Claims, 2 Drawing Sheets

MILLING MACHINE WITH MILL HEAD HAVING RETRACTIBLE RETURN

SUMMARY BACKGROUND OF THE INVENTION

The present invention relates to a milling machine with a mill head having a cutting stroke across the face of the workpiece and a return stroke retracted from the face of the workpiece to prevent cutting on return.

In milling surfaces on a workpiece it is common practice to move the mill head across the workpiece surface to be finished and then to return the mill head to its original position in preparation for cutting the next workpiece. The feed rate of the mill head in the cutting stroke is quite slow in comparison to the rate of return of the mill head. In doing so it is common for the mill head cutters to leave an undesirable trace cut on the workpiece surface on the return stroke. This is especially true where the return stroke is rapid. The undesirable trace can be minimized if a slower return stroke is used. This, however, results in an overall reduction in production rate and efficiency of the milling station. On the other hand a separate slide could be used to retract the entire milling head assembly on the return stroke. This, however, results in a complex, expensive construction.

In the present invention, a milling machine is provided with the milling head assembly including a piston structure which is hydraulically actuated to advance the mill head cutters to their cutting position and resiliently, spring biased to move the mill head cutters to a retracted, non-cutting position. Thus in the cutting stroke the piston structure is hydraulically actuated to move and hold the mill head cutters in their advanced cutting position overcoming the spring bias urging them to a retracted position. After the cutting stroke is completed the fluid pressure is relieved and the spring bias moves the piston structure and mill head cutters slightly to their retracted position assuring that the mill head cutters will not engage the workpiece face on the return stroke; while in this retracted position the milling head assembly is quickly returned past the workpiece with the mill head cutters in clearance relationship with the previously milled workpiece surface. Thus the return stroke can be rapid, i.e. 10 to 15 times faster than the cutting stroke, and the piston structure can be again hydraulically actuated to move the mill head cutters to their advanced, cutting position in preparation for the cutting stroke on the next workpiece. Thus in the present invention substantially only the mill head cutters are reciprocated between the cutting position for the cutting stroke and the retracted position for the return stroke; this results in a more simple and less expensive structure in comparison to one in which the entire milling head assembly would be reciprocated between cutting and retracted positions.

The apparatus can also be operated to finish a workpiece surface in a unique manner. In this regard, the workpiece is located such that when in the retracted position the mill head cutters will make a first rough cut across the surface. On the next cutting stroke, the mill head cutters will be moved to the advanced position for the finish cut and then retracted for the return stroke.

Thus it is an object of the present invention to provide a new and improved milling machine with a retractible mill head structure.

It is another object to provide a new and unique procedure for rough and finish cutting of a workpiece surface.

It is a general object to provide a new and improved milling machine.

Other objects, features, and advantages of the present invention will become apparent from the subsequent description and the appended claims, taken in conjunction with the accompanying drawings.

Figure 2:
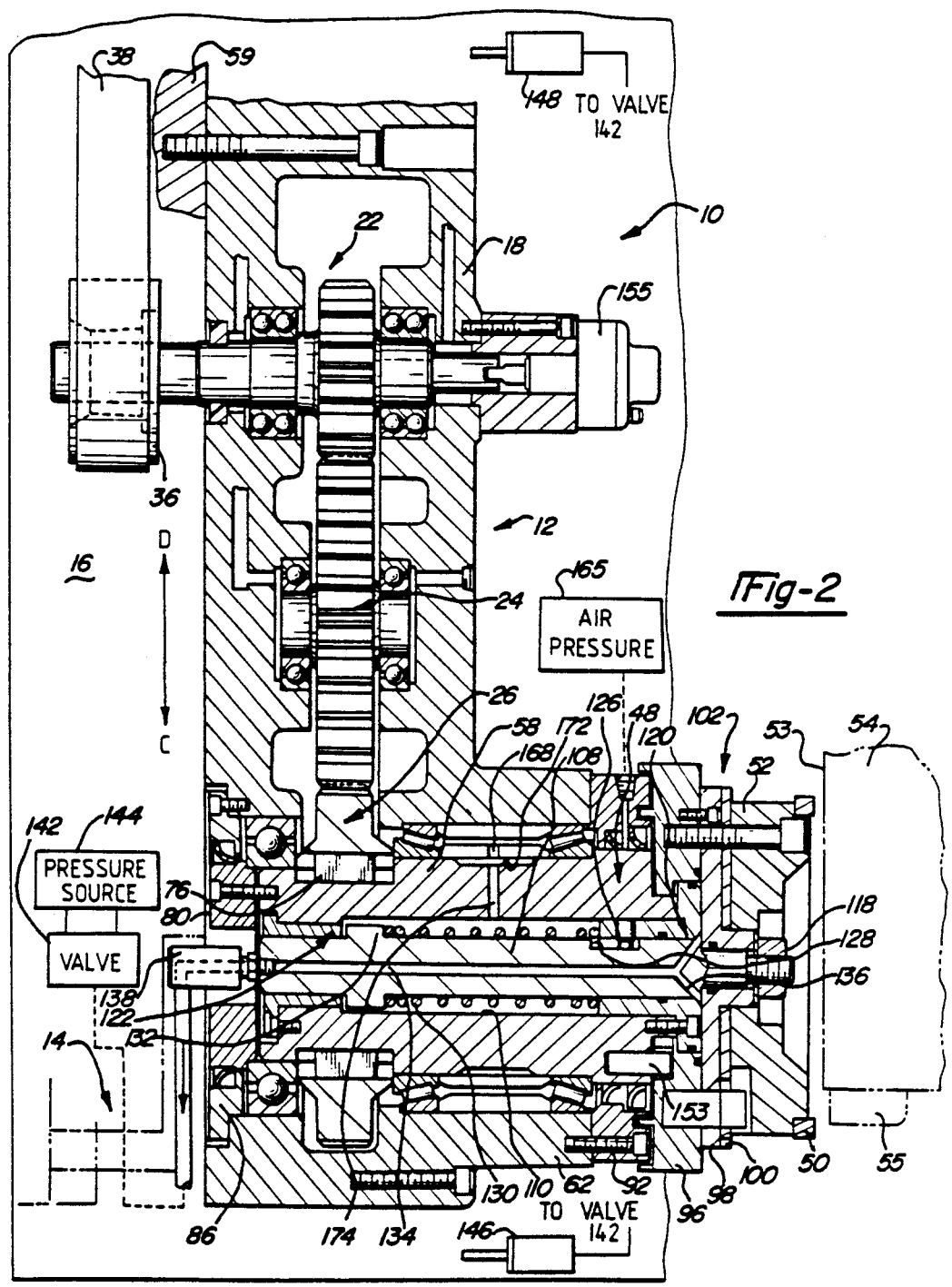

FIG. 1 is a fragmentary top elevational view with some parts shown in section of a milling machine and milling head assembly of the present invention shown with the milling head assembly actuated in its advanced mode for the cutting stroke; and FIG. 2 is a view similar to FIG. 1 showing the apparatus of FIG. 1 with the milling head assembly shown actuated to its retracted mode for the return stroke.

Looking now to FIG. 1 a milling machine 10 (only partially shown) has a milling head assembly 12. The milling head assembly 12 is preferably supported for reciprocating movement upon a slide mechanism 14 only partially shown in phantom, which is supported upon a bed 16, partially shown, of the milling machine 10. The details of the milling machine 10 including slide mechanism 14 are well known to those skilled in the art and since the details thereof do not constitute a part of the present invention these have been omitted for purposes of simplicity.

The milling head assembly 12 includes a housing body 18 which supports a gear train 20 which includes a drive gear 22, an idler gear 24 and an output gear 26.

Drive gear 22 has oppositely extending shafts 28, 30 which are journaled in ball bearings 32, 34, respectively. The shaft 30 extends outwardly from the housing body 18 and has secured thereto an output pulley 36 adapted to be driven by an endless belt 38 which in turn is driven by a pulley and motor assembly (not shown). Drive gear 22 is drivingly engaged with idler gear 24 which is supported upon oppositely extending shafts 40 and 42 which in turn are journaled in ball bearings 44, 46, respectively. Finally, idler gear 24 is drivingly engaged with output gear 26 which is connected to a cutter support mechanism 48. The cutting or milling action is provided by a plurality of mill cutters 50 supported in a cutter body 52. The construction of the cutter body 52 and mill cutters 50 can be of a generally standard, known construction. The overall gear ratio of the gear train 20 is selected relative to the rotational input speed at the output pulley 36 to provide the desired rotational speed for cutter body 52 and hence mill cutters 50 for milling a surface 53 of a workpiece 54. The workpiece 54 is only generally shown and can be held in a preselected fixed position relative to the milling head assembly 12 whereby the desired milling operation can be performed on the workpiece surface 53. In a production environment the workpiece 54 can be held on an index table or conveyor mechanism 55 such that a plurality of workpieces such as workpiece 54 can be consecutively moved into and out of the milling work station.

The housing body 18 is secured via threaded fasteners 56 to a member 59 (partially shown) of the slide mechanism 14 and hence is supported for movement in translation for providing the reciprocating movement of the mill cutters 50 relative to the surface 53 of workpiece 54 for the cutting and return strokes. The reciprocating motion for the cutting and return strokes is indicated by the arrows "C" and "D" with direction "C" being for the cutting stroke and direction "D" for the return stroke with retraction as noted below.

The support mechanism 48 includes a hollow spindle member 58 which is rotatably supported in a bore portion 60 of a stepped, through bore 61 which extends through the housing body 18 at an axially, forwardly extending end portion 62 at one longitudinal end of housing body 18. The spindle member 58 has a generally stepped outer surface configuration and has a reduced diameter, intermediate surface portion 64 at which the spindle member 58 is journaled in a pair of axially spaced tapered roller bearings 66 and 68. The bearings 66, 68 are axially spaced via a pair of radially separated spacers 70, 72. Forward bearing 68 is held against a shoulder defined by an enlarged diameter portion 74 of spindle member 58.

The output gear 26 is keyed to the rearward end of spindle 58 via a pair of diametrically spaced keys 76 located in slots 78 in spindle 58 and aligned slots 79 in output gear 26. In this way the spindle 58 is rotated with the output gear 26. The rearward end of spindle 58 is journaled in a ball bearing 84. An annular end plate 80 is fixed to the rearward end of spindle 58 via threaded fasteners 82 and bears against the inner race or ring of bearing 84 and thereby assists in axially retaining the bearing 84. An outer cover or ring 86 is fixed in a counter bore 88 at the rearward end of the stepped, through bore 61 via threaded fasteners 90. The ring 86 includes a lip seal 87 and is operative with end plate 80 to provide a seal with the outer rotating surface of the end plate 80 to maintain lubricant in and keep dirt and debris out from the through bore 61.

A forward retaining ring 92 is located at the forward end of the stepped, through bore 61 and is secured to the housing body 18 via thread fasteners 94.

The cutter body 52 is secured to a pilot ring 96 via an adapter ring 98 and spacer ring 100 to define a cutter subassembly 102. Threaded fasteners 104 secure the adapter ring 98 and pilot ring 96 together while threaded fasteners 106 secure the cutter body 52 and spacer ring 100 to the pilot and adapter rings 96, 98.

The subassembly 102 includes a piston member or positioning rod 108 which is located within a central through bore 110 in spindle member 58. The piston member 108 has a reduced diameter end portion 112 which extends through a bore 114 through adapter ring 98 and is secured to the outer end of a forwardly extending boss portion 116 via a nut and washer assembly 118. Thus the components of the subassembly 102 are secured together to move with piston member 108 as a unit in response to reciprocation of the piston member 108 within the bore 110.

The piston member 108 is slidably supported in a pair of front and rear, flanged bushings 120, 122, respectively. The front bushing 120 is secured to the outer face of spindle member 58 via threaded fasteners 124 while rear bushing 122 is secured at the rear of spindle member 58 via threaded fasteners 126. Thus flanged bushings 120, 122 are fixedly secured to spindle member 58 for rotation therewith. The pilot ring 96 has an enlarged counterbore 123 at its outer surface which receives the flange 125 of the front bushing 120. The counterbore 123 is of a depth greater than the width of the flange 125 whereby a cavity or actuating fluid cylinder 127 is defined and which serves a purpose to be described.

The piston member 108 is keyed to the front bushing 120 via a drive pin 126 which is fixed to the body of the front bushing 120 and extends radially inwardly into an axially extending groove 128 located in the outer surface of piston member 108. Groove 128 is of a limited circumferential width sufficient to accept the projecting end of the drive pin 126 with a slight clearance such that the piston member 108, and hence the subassembly 102, will be rotated with the spindle member 58 as the spindle member 58 is rotated by the output gear 26. In this manner the rotation of the cutter body 52 and mill cutters 50 is provided. At the same time, however, the drive connection between the drive pin 126 and axially extending groove 128 permits the piston member 108 and hence the subassembly 102 to be reciprocated axially relative to the spindle member 58 and front and rear bushings 120, 122, respectively, which are fixed to the spindle member 58. It is in this manner that the axial movement of the cutter body 52 and associated mill cutters 50 between the advanced, cutting position and retracted, non-cutting position is facilitated in a manner to be seen. The direction of movement of the cutter body 52 towards the advanced cutting position is indicated by the arrow "A" and towards the retracted position by arrow "B".

A coil spring 130 is located about the body of the piston member 108 and has its rearward end engageable with an enlarged diameter stop portion 132 and its forward end engageable with the body of the front bushing 120. As assembled the spring 130 is compressed to provide a bias normally urging the piston member 108 axially, rearwardly. This acts to move the entire subassembly 102, including the cutter body 52 and mill cutters 50, rearwardly to define the retracted or non-cutting position of the mill cutters 50. The subassembly 102 is shown in its retracted position in FIG. 2. As can be seen the final retracted position is determined by the engagement of the axially confronting surfaces defining the cylinder 127 which are engaged to stop the movement of the subassembly 102 in the direction of arrow "B".

The piston member 108 has a central fluid bore 134 which extends from its rearward end and terminates near the forward end of the piston member 108 in a pair of generally radially extending ports 136. The ports 136 communicate the fluid bore 134 with the cavity defined by the hydraulic actuating cylinder 127. Thus when hydraulic fluid under pressure is introduced into the fluid bore 134, and ports 136, the actuating cylinder 127 is pressurized to overcome the bias of spring 130 to cause the piston member 108 and hence subassembly 102 to move axially forwardly in the direction of arrow "A" bringing the cutter body 52 and mill cutters 50 into their advanced or cutting position for the cutting stroke against the surface 53 of workpiece 54. The keyed connection between pin 126 and groove 128 provides rotation of the subassembly 102 with the spindle member 58 while permitting axial movement. The milling head assembly 12 is shown in FIG. 1 in its cutting stroke mode with the subassembly 102 including cutter body 52 and mill cutters 50 in the axially advanced or cutting position.

A hydraulic connector 138 is connected at the rear of piston member 108 and in fluid communication with passageway or bore 134. A fluid line 140 connects the connector 138 to a solenoid actuated valve 142 which in turn is connected to a source of hydraulic fluid pressure 144. Sensing switches 146 and 148 are located to sense the position of the milling head assembly 12 and are operatively connected to the valve 142 such that on the cutting stroke (movement in direction of arrow "C")

the valve 142 is actuated to connect the fluid bore 140 to the high pressure side of the pressure source 144 whereby actuating cylinder 127 will be pressurized. Switches 146, 148 sense the completion of the cutting stroke whereby the valve 142 is actuated to connect the fluid line 140 to the low pressure or tank, return side of the pressure source 144 such that the fluid in the actuating cylinder 127 can be returned to tank as the return spring 130 moves the piston member 108 and hence subassembly 102, including cutter holder 52 and mill cutters 50, in the direction of arrow "B" to the retracted, non-cutting position. Thus on the return stroke (movement in direction of arrow "D") the mill cutters 50 will be axially retracted such that they will be in clearance relationship with the surface 53 of the workpiece 54 which was just milled. In one form of the invention the subassembly 102 with mill cutters 50 was adapted to axially retract 0.030 inches to assure clearance of the mill cutters 50 with the newly finished surface 53 on the return stroke. Also, in one form of the invention the milling head assembly 12 was moved at a rate of around 20 inches per minute for the cutting stroke and was returned at a rate of 300 inches per minute on the return stroke with mill cutters 50 in the retracted position. Sensing switches 146 and 148, valve 142 and pressure source 144 are only generally shown since the location and implementation of these components is within the purview of one skilled in the art and further since the specific details thereof do not constitute a part of the present invention such details have been omitted for purposes of simplicity.

It should be noted that in the present invention only the subassembly 102 is reciprocated axially between the advanced cutting position (direction of arrow "A") and the retracted non-cutting position (direction of arrow "B"). In this regard the spindle 58 and associated structure and support bearings are not moved axially thus providing for a simple actuating structure.

The hydraulic fitting 138 is of construction known in the art and of a type adapted to provide a fluid coupling for transmitting fluid under pressure from a stationary source to a rotating member such as piston member 108. One type of such hydraulic fitting is defined as a Dueblin fitting number 1005-020-019.

The pilot ring 96 is slidably supported on the flange 125 and is provided with a pair of radially spaced ring portions 150, 152. The outer ring portion 150 overenengages the outer surface of the forward retaining ring 92 while the inner ring portion 152 is adapted to be located within an annular groove 154 in the outer face of the pilot ring 96. The above structure is adapted to inhibit dirt and debris (including cutting chips) from entering in the space between the axially movable pilot ring 96 and axially stationary retaining ring 92. In addition an air inlet 164 is connected to a source of air pressure 165 such as to provide air flow past lip seal 167 into the space between retaining ring 92 and pilot ring 96 to further assure that dirt and debris will be precluded from entering that space. The air pressure also assists in the sealing effect of lip seal 169 by slightly pressurizing the lip against the sealed surface of enlarged diameter portion 74.

A drive pin 153 is mounted on the outer face of the spindle member 58 to provide a driving engagement with a slot 157 in the pilot ring 96 whereby the spindle member 58 and pilot ring 96 are keyed together for rotation.

Note that the use of hydraulic fluid pressure to actuate the subassembly 102 in one direction with spring return provides for a construction which is relatively less complex than one in which hydraulic or fluid pressure is used for actuation in both directions, although such actuation could be adapted to the present invention. With the simpler embodiment shown, however, it is advantageous to use the hydraulic fluid pressure to place and hold the subassembly 102 in the advanced cutting position for the cutting stroke and to use the spring 130 to place and hold subassembly 102 in its retracted position since the hydraulic holding pressure will be effective to inhibit chatter during the cutting stroke.

The milling head assembly 12 is provided with a lubricating pump 155 which is keyed via key 157 to an extension portion 154 of shaft 28 associated with drive gear 22. Thus the rotary pump 155 is driven by rotation of the drive gear 22 via the output pulley 36. Pump 155 provides lubrication to the various bearings and other rotating and engaged parts via passageways such as passageways 156, 158, 160, and 162. Similarly, the radial gap 166 between spacers 70, 72, passageway 168 in spacer 72 which communicates with annular groove 172 in piston member 108 and radial through bore 174 from groove 172 to central bore 110 and hence to piston member 108 define means for providing lubricant to the bore 110. Numerous fluid seals are utilized where shown, for example, and since the use of such lubricating system and the application of such seals is well within the purview of one skilled in the art and such does not constitute a part of the present invention a detailed description thereof has been omitted for purposes of simplicity. It should also be noted that while the embodiment shown and described utilizes hydraulically pressurized fluid to actuated the piston member 108, pneumatic fluid actuation could also be used. In this regard the spindle member 58 could be constructed to be driven directly or by a pulley arrangement without the use of a gear train such as gear train 20.

Note that with the structure as shown a unique rough and finish cutting procedure on the surface 53 of workpiece 54 can be readily and accurately attained. Thus the workpiece 54 can be positioned on the table 55 such that the surface 53 will be engaged by the mill cutters 50 when the subassembly 102 is in its fully retracted position. Because the first cut made is a rough cut the milling head assembly 12 can be returned rapidly. A cutting trace at this point is of no consequence. Next the subassembly 102 is actuated to its advanced position for the finished cut across the surface 53. Now the subassembly 102 can be retracted for rapid return assuring no trace cut on the now finished surface 53. Depending upon the type of mill cutters utilized the above rough cutting could be done on the first stroke, i.e. retracted position of cutters, and the finish cut could be made on the return stroke, i.e. advanced position of cutters.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A milling machine for cutting a surface on a workpiece and including:
   a milling head assembly having a cutting stroke for cutting the surface of the workpiece and a return stroke to prepare for the next cutting stroke, said milling head assembly including:

a spindle structure, spindle support means for supporting sand spindle structure for rotation about a preselected axis, power means connected to said spindle structure for rotating said spindle structure about said preselected axis, cutter means including at least one cutter member actuable to provide a desired cut on the workpiece surface, rod positioning means operatively connected with said cutter means to axially position said cutter means between an advanced position and a retracted position relative to the workpiece surface as said cutter member is moved in opposite directions traversing the workpiece surface, said cutter means being operable in said advanced position to axially locate said cutter member to provide a desired cut on the workpiece surface on said cutting stroke and operable to a retracted position to axially locate said cutter member to preclude cutting engagement with the workpiece surface on said return stroke, connecting means connecting said rod positioning means and said cutter means to said spindle structure for rotation with said spindle structure and for axial movement relative to said spindle structure, actuating means operably connected with said rod positioning means to actuate said rod positioning means and hence said cutter means to said advanced position for said cutting stroke and to said retracted position for said return stroke.

2. The apparatus of claim 1 with said rod positioning means and said spindle structure defining actuating cylinder means being actuable to effectuate movement of said rod positioning means to at least one of said advanced and retracted positions.

3. The apparatus of claim 2 with said actuating cylinder means being actuable to effectuate movement of said rod positioning means to said advanced position and with the apparatus further comprising resilient bias means operative with said rod positioning means and said spindle structure for urging said rod positioning means to said retracted position.

4. The apparatus of claim 1 with said power means including a gear train drive with an output gear connected with said spindle structure for rotation with said spindle structure about said preselected axis.

5. The apparatus of claim 3 with said power means including a gear train drive with an output gear connected with said spindle structure for rotation with said spindle structure about said preselected axis.

6. The apparatus of claim 2 with said rod positioning means comprising a piston member supported within a cavity in said spindle structure and operatively associated with said cylinder means to provide axial movement of said rod positioning means to said at least one of said advanced and retracted positions in response to fluid pressure applied to said cylinder means.

7. The apparatus of claim 6 with said power means including a gear train drive with an output gear connected with said spindle structure for rotation with said spindle structure about said preselected axis.

8. A milling machine for cutting a surface on a workpiece and including a milling head assembly having a cutting stroke for cutting the surface of the workpiece and a return stroke to prepare for the next cutting stroke, said milling head assembly including:

a rotatable spindle structure, power means for rotating said spindle structure about a preselected axis, cutter means actuable to provide a desired cut on the workpiece surface, positioning means operatively connected with said cutter means to axially position said cutter means between an advanced position to provide a desired out on the workpiece surface and a retracted position relative to the workpiece surface to preclude cutting engagement with the workpiece surface as said cutter means is moved in opposite directions traversing the workpiece surface, connecting means connecting said positioning means and said cutter means to said spindle structure for rotation with said spindle structure and for axial movement relative to said spindle structure, actuating means operably connected with said positioning means to actuate said positioning means to said advanced position for said cutting stroke and to said retracted position for said return stroke.

9. The apparatus of claim 8 with said positioning means and said spindle structure defining actuating cylinder means being actuable to effectuate movement of said positioning means to at least one of said advanced and retracted positions.

10. The apparatus of claim 9 with said actuating cylinder means being actuable to effectuate movement of said positioning means to said advanced position and with the apparatus further comprising resilient bias means operative with said positioning means and said spindle structure for urging said positioning means to said retracted position.

11. The apparatus of claim 8 with said power means including a gear train drive with an output gear connected with said spindle structure for rotation with said spindle structure about said preselected axis.

12. The apparatus of claim 10 with said power means including a gear train drive with an output gear connected with said spindle structure for rotation with said spindle structure about said preselected axis.

13. The apparatus of claim 9 with said positioning means comprising a piston member supported within a cavity in said spindle structure and operatively associated with said cylinder means to provide axial movement of said positioning means to said at least one of said advanced and retracted positions in response to fluid pressure applied to said cylinder means.

14. The apparatus of claim 13 with said power means including a gear train drive with an output gear connected with said spindle structure for rotation with said spindle structure about said preselected axis.

15. A milling machine for cutting a surface on a workpiece and including a milling head assembly having a cutting stroke for cutting the surface of the workpiece and a return stroke to prepare for the next cutting stroke, said milling head assembly including:

a rotatable spindle structure mounted for rotation about a preselected axis, cutter means mounted to said spindle structure for rotation therewith and actuable to provide a desired cut on the workpiece surface, piston and cylinder means mounted with said spindle structure for rotation therewith about said preselected axis and operatively connected with said cutter means to axially position said cutter means along said preselected axis between an advanced position to provide a desired cut on the workpiece surface and a retracted position relative to the workpiece surface to preclude cutting engagement with the workpiece surface as said cutter means is moved in opposite directions traversing the workpiece surface.

16. In a milling machine for cutting a surface on a workpiece and including a milling head assembly having a cutting stroke for cutting the surface of the workpiece and a return stroke to prepare for the next cutting stroke, said milling head assembly including a rotatable spindle structure, power means for rotating said spindle structure about a preselected axis, cutter means actuable to provide a desired cut on the workpiece surface, positioning means operatively connected with said cutter means to axially position said cutter means between an advanced position to provide a desired cut on the workpiece surface and a retracted position relative to the workpiece surface to preclude cutting engagement with the workpiece surface as said cutter means is moved in opposite directions traversing the workpiece surface, connecting means connecting said positioning means and said cutter means to said spindle structure for rotation with said spindle structure and for axial movement relative to said spindle structure, actuating means operably connected with said positioning means to actuate said positioning means to said advanced position for said cutting stroke and to said retracted position for said return stroke, the method of cutting the workpiece surface comprising the steps of:

locating the workpiece such that the workpiece surface is in a position for a first cut by said cutter means when said cutter means is in said retracted position, causing said actuating means to actuate said positioning means to locate said cutter means in said retracted position, moving said cutter means in its cutting stroke to make said first cut on the workpiece surface with said cutter means in said retracted position, returning said cutter by means of said return stroke, causing said actuating means to actuate said positioning means to locate said cutter means in said advanced position, moving said cutter means in its cutting stroke to make a second cut on the workpiece surface, causing said actuating means to actuate said positioning means to locate said cutter means in said retracted position for said return stroke.

17. In a milling machine including a milling head assembly for cutting the surface of a workpiece, said milling head assembly including a rotatable spindle structure, power means for rotating said spindle structure about a preselected axis, cutter means actuable to provide a desired cut on the workpiece surface, positioning means operatively connected with said cutter means to axially position said cutter means between an advanced position relative to the workpiece surface and a retracted position relative to the workpiece surface as said cutter means is moved in opposite directions traversing the workpiece surface, connecting means connecting said positioning means and said cutter means to said spindle structure for rotation with said spindle structure and for axial movement relative to said spindle structure, actuating means operably connected with said positioning means to actuate said positioning means to said advanced position and to said retracted position, the method of cutting the workpiece surface comprising the steps of:

locating the workpiece such that the workpiece surface is in a position for a first cut by said cutter means when said cutter means is in said retracted position, causing said actuating means to actuate said positioning means to locate said cutter means in said retracted position, moving said cutter means in a first stroke relative to the workpiece surface to make said first cut on the workpiece surface with said cutter means in said retracted position, causing said actuating means to actuate said positioning means to locate said cutter means in said advanced position, moving said cutter means in a second stroke relative to the workpiece surface to make a second cut on the workpiece surface.

18. The method of claim 17 with said first stroke being in one direction relative to the workpiece surface and said second stroke being in an opposite direction relative to the workpiece surface.

19. The method of claim 17 with said first stroke being in one direction relative to the workpiece surface, said second stroke being in said one direction relative to the workpiece surface and causing said actuating means to actuate said positioning means to locate said cutter means in said retracted position after said second stroke for a third stroke of said cutter means in a direction opposite to said one direction with said cutter means precluded from cutting the workpiece surface in said third stroke.

* * * * *

UNITED STATES PATENT AND TRADEMARK OFFICE
CERTIFICATE OF CORRECTION

PATENT NO. : 5,054,975

DATED : October 8, 1991

INVENTOR(S) : Walter W. Wawrzyniak and Richard A. Habarth

It is certified that error appears in the above-identified patent and that said Letters Patent is hereby corrected as shown below:

Col. 8, line 11, Claim 8, delete "out" and substitute therefor --cut--.

Signed and Sealed this

Tenth Day of August, 1993

Attest:

MICHAEL K. KIRK

Attesting Officer

Acting Commissioner of Patents and Trademarks